(12) United States Patent
Chen et al.

(10) Patent No.: US 6,876,507 B2
(45) Date of Patent: Apr. 5, 2005

(54) HIGH-SATURATION THIN-FILM WRITE HEAD FOR HIGH-COERCIVITY MAGNETIC DATA STORAGE MEDIA

(75) Inventors: Mike Ming Yu Chen, San Mateo, CA (US); Thomas Edward Dinan, San Jose, CA (US); Paul Phong Nguyen, San Jose, CA (US); Neil Leslie Robertson, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 10/054,554

(22) Filed: Jan. 18, 2002

(65) Prior Publication Data

US 2003/0137767 A1 Jul. 24, 2003

(51) Int. Cl.⁷ .............................................. G11B 15/18
(52) U.S. Cl. ......................................... 360/71; 360/126
(58) Field of Search ................ 360/71, 126; 29/603.07, 29/603.13, 603.14; 428/692, 693

(56) References Cited

U.S. PATENT DOCUMENTS

| | | | |
|---|---|---|---|
| 4,589,042 A | 5/1986 | Anderson et al. | 360/125 |
| 5,168,410 A | 12/1992 | Liao | 360/125 |
| 5,372,698 A | 12/1994 | Liao | 205/90 |
| 5,606,478 A | 2/1997 | Chen et al. | 360/126 |
| 5,812,350 A | 9/1998 | Chen et al. | 360/126 |
| 5,864,450 A | 1/1999 | Chen et al. | 360/113 |
| 5,966,800 A | 10/1999 | Huai et al. | 29/603.13 |
| 6,118,629 A | 9/2000 | Huai et al. | 360/126 |
| 6,195,232 B1 * | 2/2001 | Cohen | 360/126 |
| 6,221,218 B1 * | 4/2001 | Shi et al. | 204/192.2 |
| 6,262,867 B1 | 7/2001 | Sano et al. | 360/126 |
| 6,296,955 B1 * | 10/2001 | Hossain et al. | 428/692 |
| 6,724,571 B2 * | 4/2004 | Dinan et al. | 360/126 |

* cited by examiner

*Primary Examiner*—Sinh Tran
*Assistant Examiner*—Jason Olson
(74) *Attorney, Agent, or Firm*—Ervin F. Johnston (57) ABSTRACT

A thin-film write head employing pole pieces formed of an electroplated body-centered cubic (BCC) nickel-iron alloy with a saturation flux density ($B_S$) of 1.9 to 2.3 T (19 to 23 kG) and an acceptable coercivity ($H_C$) of about 80 to about 160 A/m (1–2 Oe). The iron content of the electroplated nickel-iron alloy is from 64% to 81% by weight. The two-layer pole fabrication process holds magnetic anisotropy and coercivity to useable values while improving saturation flux density and optimizing magnetostriction. This is accomplished by first electroplating a BCC nickel-iron layer onto an underlying seed layer and then annealing the two layers to reduce coercivity to less than about 160 amps/meter and raise magnetization to acceptable levels.

21 Claims, 8 Drawing Sheets

HIGH-SATURATION THIN-FILM WRITE HEAD FOR HIGH-COERCIVITY MAGNETIC DATA STORAGE MEDIA

BACKGROUND OF THE INVENTION

1. Field of the Invention

This invention relates generally to thin-film write heads and more particularly to write heads employing alloys with high saturation flux densities for the magnetic poles in an inductive write element that is useful for writing data to high-coercivity magnetic media.

2. Description of the Related Art

The terminology and units used in the magnetic materials arts vary from one region to another. Accordingly, a brief summary of terminology used herein is presented for clarity. Magnetic Flux is expressed in Système International d'unités (SI) units of webers (Wb) or volt-seconds, each of which is exactly equivalent to 100,000,000 maxwells (Mx). Magnetic Flux Density (B) is expressed in SI units of teslas (T), each of which is exactly equivalent to 10,000 gauss (G). Magnetic Field Intensity (H) is expressed in SI units of amperes per meter (A/m), each of which is approximately equivalent to about 0.0126 oersteds (Oe). As used herein, the Permanent Magnetic Moment or Magnetization ($B_M$) of a material is the magnetic flux density (B) in teslas present in the material with no external magnetic H-field applied. The Saturation Flux Density ($B_S$) of a material (commonly denominated $4\pi M_S$) is the maximum magnetic flux density (B) in teslas that can be induced in the material by a large external magnetic field (H-field). The Remanence or Retentivity ($B_R < B_S$) of a material is the magnetic moment in teslas remaining in the material after forcing the material into saturation along the easy axis and then removing the external H-field. The Coercivity ($H_C$) of a material is the magnetic field (H-field) intensity in amperes per meter required to overcome the remanence moment ($B_R$) to reduce the magnetic flux density (B) in the material to zero along the easy axis. The Anisotropic Field ($H_K > H_C$) of a material is the magnetic field (H-field) intensity in amperes per meter required to induce the saturation flux density ($B_S$) in the material along the hard axis normal to the easy axis. The permeability of a material ($\mu$) is defined as the ratio B/H with appropriate units and may be shown to be about the same as $B_S/H_K$ when large.

The inductive head and the inductive/magnetoresistive (MR) head are well-known in the art. Both of these heads can write and read signals with respect to a magnetic medium such as a rotating disk medium or a streaming tape medium. The inductive head usually includes first and second poles having first and second pole tips, respectively. The pole tips are separated by a gap at an air bearing surface (ABS) or head surface. A coil is disposed between the first and second poles to couple magnetically thereto. The head assembly uses an inductive write head portion to perform write functions and a MR read head portion to perform read functions. The read head portion includes an MR sensor sandwiched between a pair of read gap layers, which are in turn sandwiched between first and second shield layers. Either type of magnetic head is usually mounted on or embedded in a slider that is supported in a transducing relationship with respect to a magnetic medium. The magnetic medium may be either a magnetic disk or a magnetic tape.

Considerable effort has been undertaken by practitioners in the art to increase the recording density of magnetic heads. Decreasing the length (i.e., the thickness) of the gap between the first and second pole tips permits writing of more bits per inch of media. Further, increasing the coercivity ($H_C$) of the magnetic medium allows the medium to accurately retain data with a higher areal bit density with less thermal degradation. A consequence of such higher bit density is a higher data transfer rate for information between the head and the medium.

These magnetic media coercivity and density improvements require the magnetic pole materials to conduct relatively high magnetic flux densities, especially those portions of the poles (the pole tips) adjacent to the gap at the ABS. However, the ferromagnetic (FM) pole materials have a saturation flux density ($B_S$) limit beyond which they can conduct no more magnetic flux. Accordingly, there is a need for a pole tip structure having a high saturation flux density ($B_S$) to operate effectively with newer high-coercivity magnetic media.

The first and second pole pieces, including the pole tips, are commonly constructed of Permalloy ($Ni_{81}Fe_{19}$), which combines 81% nickel with 19% iron by weight. Permalloy is a desirable material for pole-construction, having good soft magnetic properties (low coercivity $H_C$ and high saturation flux density $B_S$) and being easy to shape by normal patterning and deposition techniques. Further, Permalloy has good corrosion resistance for head reliability. Permalloy has a saturation flux density ($B_S$) of about 1.0 T (10 kG) and a coercivity ($H_C$) of no more than 20 A/m (0.2 Oe) at worst. But it is desirable to increase this saturation flux density ($B_S$) value so that the pole tips can carry the larger magnetic flux density required to overcome the high coercivity ($H_C$) of modem recording media without saturating.

Cobalt-based magnetic alloys have a higher saturation flux density ($B_S$) than Permalloy. However, cobalt materials have significantly worse corrosion resistance. Another family of high-$B_S$ materials is the sputtered FeNiX materials, where X is from the group of tantalum, aluminum, and rhodium. But sputter-deposition of the pole pieces is not as desirable as frame-plating because ion-milling is required after sputtering to shape the trackwidth of the pole tips. This process is very difficult to implement. And sputtered materials exhibit a high stress that can distort recorded signals. Moreover, magnetically forming a thick film of such materials using sputtering is difficult because the sputtered material has a large magnetocrystalline anisotropy and the crystal grain size of the sputtered film becomes large so the anisotropic field ($H_K$) is disadvantageously large. An electroplating method is preferred to suppress the crystal grain size to a small value to minimize the anisotropic field ($H_K$) while retaining the desired high saturation flux density ($B_S$).

The commonly-assigned U.S. Pat. No. 4,589,042 discloses an inductive read/write head wherein the pole tip regions of the magnetic poles are fabricated of a high-$B_S$ nickel-iron alloy material ($Ni_{45}Fe_{55}$) with about 55% iron by weight, while the remainder of the pole structure is made of Permalloy. But the $Ni_{45}Fe_{55}$ material exhibits high magnetostriction and can be used only if the head design is modified to accommodate the magnetostrictive characteristics of the material.

The commonly-assigned U.S. Pat. No. 5,864,450 also discloses a head pole structure using a nickel-iron alloy with 50–60% iron by weight. This material has a saturation flux density ($B_S$) in the range of 1.5 to 1.7 T (15 to 17 kG) with high resistivity and a lower permeability than Permalloy. The saturation flux density ($B_S$) of the pole-tips is further increased by employing a metal-in-gap (MIG) configuration at the pole-tips such that one or more of the pole tips is configured in a bilayer with one of the layers being the higher-$B_S$ $Ni_{45}Fe_{55}$ material and the other layer having a lower $B_S$. The higher-$B_S$ $Ni_{45}Fe_{55}$ material is placed adjacent the gap where it is most needed and the remaining material can be selected to mitigate the magnetostriction problem.

In U.S. Pat. No. 6,262,867, Sano et al. disclose an electroplated thin film pole structure made of a nickel-iron alloy having 38% to 60% nickel by weight and 40% to 62% iron by weight with a crystal grain size smaller than 50 nanometers. Sano et al. teach that the saturation flux density ($B_S$) drops below 1.5 T (15 kG) when the proportion of nickel in the alloy drops below 38% or rises above 60% and suggest adding one element selected from the group consisting of cobalt, molybdenum, chromium and palladium in an amount less than 3% by weight.

In U.S. Pat. No. 5,372,698, Liao discloses an electroplated pole structure that includes 90% cobalt and a trace of boron with iron electroplated onto a substrate. A saturation flux density ($B_S$) of about 1.9 T (19 kG) is achieved by imposing a rotating external magnetic field during the electroplating process or during a subsequent annealing step. The boron is said to lower the coercivity ($H_C$) of the pole elements to about 80 A/m (1.0 Oe) and an advantageously low anisotropic field ($H_K$) of about 550 A/m (7 Oe) results from the electroplating process.

Continuing increases in media storage bit densities require continuing improvements in write head performance. It would be desirable to improve the saturation flux density (BS) of the simpler nickel-iron alloy pole layers by adding iron to the alloy to provide more than 62% iron by weight. The prior art generally teaches away from this idea because alloys with higher iron concentrations are known to have too much coercivity ($H_C$=250 A/m or more) and thus cannot handle the high frequencies required to write high-density data to a high-$H_C$ medium. As a result of this widely-held belief, the pole material of choice in the art is currently nickel-iron alloy with about 55% iron by weight ($Ni_{45}Fe_{55}$). But the saturation flux density of this material is limited to about 1.75 T (17.5 kG) at best. Newer high-$H_C$ data recording media are pushing the flux limits for heads using this material. The few known alternative low-$H_C$ materials with higher $B_S$ are substantially more difficult to fabricate into acceptable pole structures.

These unresolved problems and deficiencies are clearly felt in the art and are solved by this invention in the manner described below.

SUMMARY OF THE INVENTION

This invention resolves these deficiencies by introducing thin-film write head employing pole pieces formed of an electroplated nickel-iron alloy having a body-centered cubic (BCC) structure with a saturation flux density ($B_S$) of 1.9 to 2.3 T (19 to 23 kG) and an acceptable coercivity ($H_C$) of about 80 A/m (1 Oe). The iron content of the electroplated nickel-iron alloy is from about 64% to about 81% by weight. The two-layer pole fabrication process of this invention holds magnetic anisotropy and coercivity to useable values while improving saturation flux density and optimizing magnetostriction. This is accomplished by first electroplating a nickel-iron layer onto an underlying seed layer and then annealing the two layers to reduce coercivity to less than about 160 amps/meter and raise magnetization to acceptable levels. The preferred electroplating process is controlled to provide the necessary BCC structure in the electroplated nickel-iron alloy layer.

It is a purpose of this invention to provide a thin-film write head that can produce higher magnetic flux levels than existing designs. It is an advantage of the write head of this invention that the higher flux levels can be employed to write data to higher-coercivity media, thereby improving data storage density and stability.

In one aspect, the invention is a magnetic head including first and second pole pieces having first and second pole tips separated by a gap layer, the first and second pole pieces each including a BCC nickel-iron alloy layer containing from about 64% to about 81% iron by weight.

In another aspect, the invention is a magnetic read/write head including first and second pole pieces having first and second pole tips separated by a first gap layer and a magnetoresistive (MR) sensor sandwiched between second and third gap layers, the second and third gap layers being sandwiched between first and second shield layers, the second shield layer being generally adjacent to the first pole piece, and the first and second pole pieces each including a BCC nickel-iron alloy layer containing from about 64% to about 81% iron by weight.

In an exemplary embodiment, the invention is a magnetic data storage drive for storing data on a magnetic medium, including a magnetic head with first and second pole pieces having first and second pole tips separated by a gap layer, the first and second pole pieces each including a BCC nickel-iron alloy layer containing from about 64% to about 81% iron by weight, a housing, a support mounted in the housing for supporting the magnetic head, medium moving means mounted in the housing for moving the magnetic medium past the magnetic head in a transducing relationship therewith, positioning means connected to the support for moving the magnetic head to a plurality of positions with respect to the moving magnetic medium so as to process signals with respect to a plurality of data storage tracks on the magnetic medium, and control means connected to the magnetic head, the medium moving means and the positioning means for controlling and processing signals with respect to the magnetic head, controlling movement of the magnetic medium and controlling the position of the magnetic head. The magnetic data storage drive may be embodied as a disk drive or as a tape drive, for example.

In yet another aspect, the invention is a method of fabricating a magnetic write head including the steps of providing a substrate, forming a first magnetic pole layer over the substrate by performing the steps of forming a first underlying seed layer of a first ferromagnetic (FM) material having a first saturation flux density and electroplating the first underlying seed layer with a second FM material having a second saturation flux density no greater than the first saturation flux density, forming a gap filling layer over the first magnetic pole layer, and forming a second magnetic pole layer over the gap filling layer by performing the steps of forming a second underlying seed layer of a third FM material having a third saturation flux density and electroplating the second underlying seed layer with a fourth FM material having a fourth saturation flux density no greater than the third saturation flux density.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DESCRIPTION OF THE PREFERRED EMBODIMENT

Figure 1:
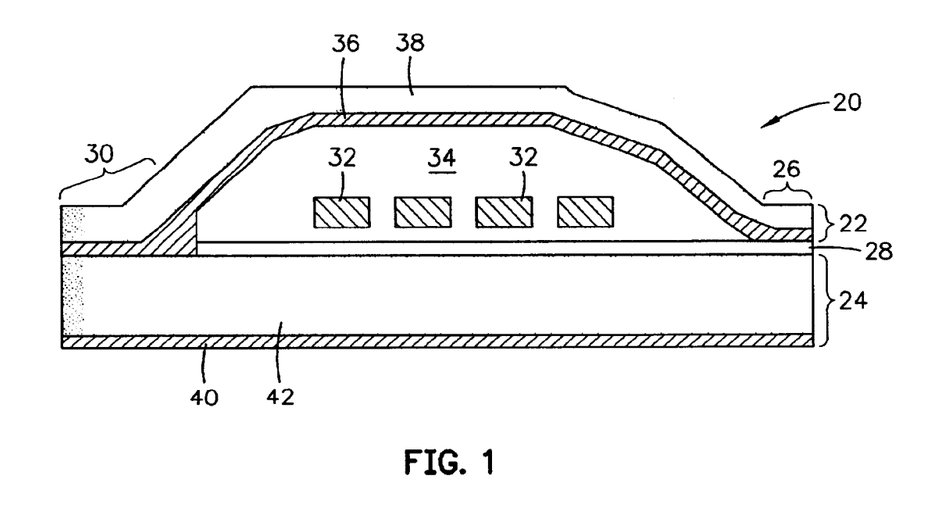
FIG. 1 is a schematic diagram of the pole structures of an exemplary thin-film magnetic write head of this invention.

FIG. 1 is a schematic diagram of the pole structures of an exemplary thin-film magnetic head embodiment 20 of this invention showing the upper pole piece 22 and the lower pole piece 24 separated at the pole-tip region 26 by a pole-tip gap layer 28. Upper and lower pole pieces 22–24 each include a pole tip in pole-tip region 26 and are joined to one another in the yoke region 30 to complete the magnetic pole flux circuit in the well-known manner. A series of magnetic coil windings exemplified by the coil winding 32 are shown in cross-section separated from upper pole piece 22 and pole-tip gap layer 28 by an insulating structure 34 composed of several intermediate layers (not shown) of nonconducting nonmagnetic material. A writing current (not shown) in coil winding 32 is coupled to the magnetic flux in upper and lower pole layers 22–24) in the usual manner through yoke connection 30.

Upper pole piece 22 includes a seed layer 36 and an electroplated layer 38. Upper pole piece 24 includes a seed layer 40 and an electroplated layer 42. Electroplated layers 38 and 42 are formed entirely of a nickel-iron alloy having a body-centered cubic (BCC) structure with from about 64% to about 81% iron by weight. The preferred electroplating process for providing the necessary composition and BCC structure in the electroplated nickel-iron alloy layer is described in the commonly-assigned U.S. patent application Ser. No. 10/053,785 filed Nov. 8, 2001 entitled "A Method for Electroplating a Body-Centered Cubic Nickel-Iron Alloy Thin Film with a High Saturation Flux Density," which is entirely included herein by reference.

Because of the electroplating method used in forming electroplated layers 38 and 42, the alloy has a small domain size and therefore a relatively low anisotropic field ($H_K$) with a very high saturation flux density ($B_S$) of from about 1.9 to about 2.3 T (19 to 23 kG). Seed layers 36 and 40 are preferably formed of an alloy having an equal or higher saturation flux density ($B_S$) value. For example, seed layers 36 and 40 may be formed of a sputtered nickel-iron alloy with 64% to 81% iron by weight. Or, as another example, seed layers 36 and 40 may be formed of a sputtered iron-nitride-X (FeNX) alloy, or a cobalt-iron-X (CoFeX) alloy where X is from the group comprising nickel, nitrogen, rhodium, aluminum, tantalum or other suitable element, as long as the seed layer saturation flux density ($B_S$) value is no less than the about 1.9 to about 2.3 T (19 to 23 kG) value of electroplated layers 38 and 42. Seed layers 36 and 40 may be deposited by sputtering, ion beam deposition or vacuum deposition (evaporation). After plating, a two-hour anneal at 245 degrees Celsius, in an external magnetic field of about 64 kA/m (800 Oe) aligned with the electroplated layer easy axis, is required to reduce the coercivity ($H_C$) of electroplated layers 38 and 42 from the usual 3 Oe to about 1 Oe and to increase the magnetic moment in the material to the desired level.

Upper and lower pole layers 22–24 can transmit magnetic flux levels of over 2 T (20 kG) without saturating, at high frequencies because of the relatively low coercivity ($H_C$). Thus, write head 20 is suitable for writing magnetic data onto high-coercivity magnetic storage media at high frequencies required to support the increased areal data storage densities demanded today.

Figure 2:
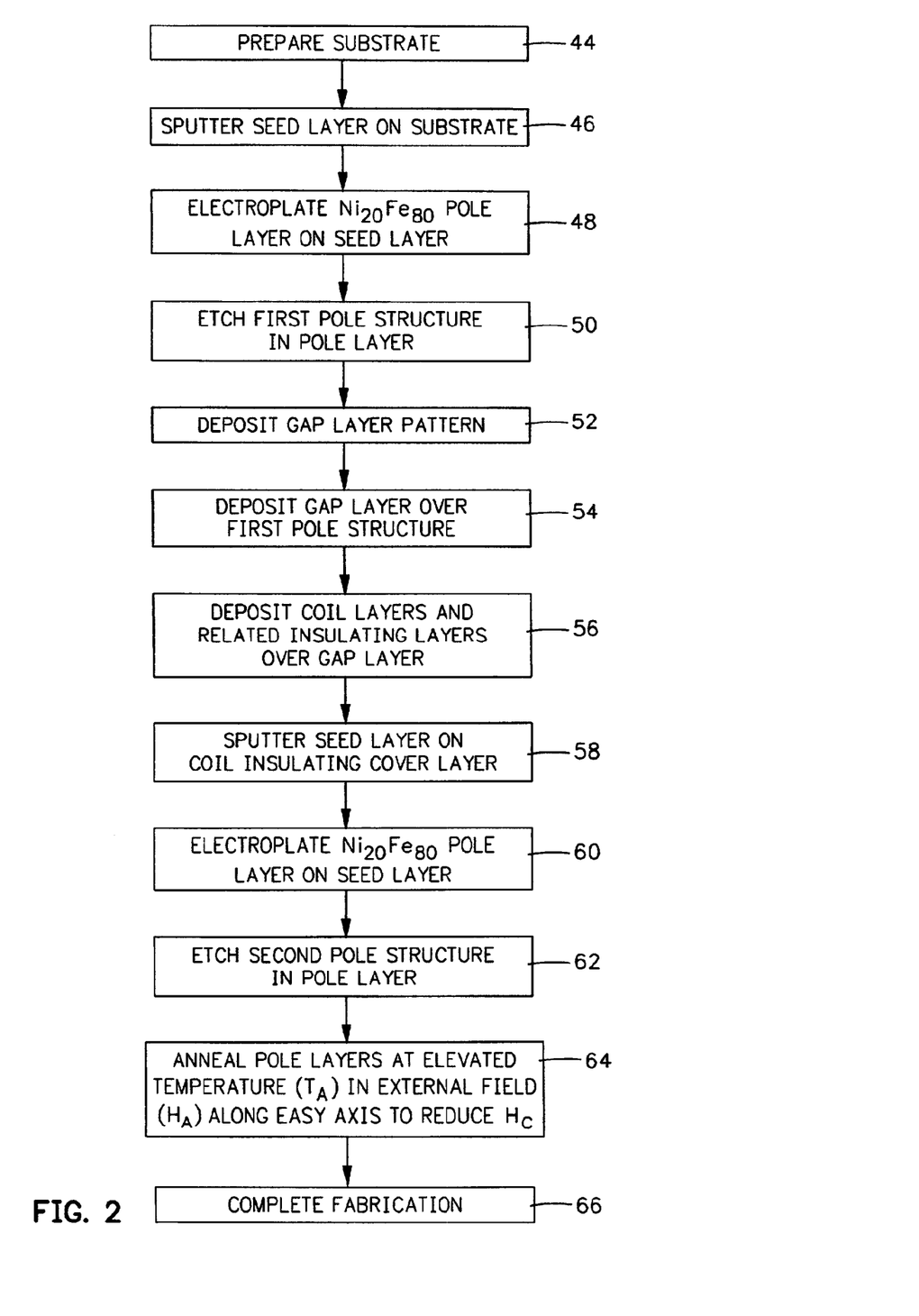
FIG. 2 is a schematic diagram of a flowchart illustrating an exemplary method of this invention for fabricating the magnetic head of FIG. 1.

FIG. 2 is a schematic diagram of a flowchart illustrating an exemplary method of this invention for fabricating magnetic head 20 (FIG. 1). The exemplary process begins with the preparation of a suitable substrate in the step 44. In step 46, a first seed layer is sputtered (or evaporated) onto the substrate using an alloy with acceptable saturation flux density ($B_S$). A thicker layer of nickel-iron alloy with 81% iron by weight (for example) is then electroplated over the first seed layer in step 48. In step 50, the two lower ferromagnetic (FM) layers are then patterned and etched in any useful manner to define the lower pole piece having pole-tip and yoke regions (FIG. 1). The pole-tip gap layer pattern is deposited in step 52 and the pole-tip gap layer is then deposited over the lower pole piece in step 54 using any suitable nonmagnetic nonconductive material. In step 56, a series of masking, deposition, and etching procedures are employed to define the coil layers and the intermediate insulating layer structure discussed above (FIG. 1). The last layer formed in step 56 is a coil insulating cover layer disposed to provide a relatively smooth profile on which the second seed layer is deposited (sputtered or evaporated) in step 58. In step 60, a thicker layer of nickel-iron alloy with 81% iron by weight (for example) is then electroplated over the second seed layer. In step 62, the two upper FM layers are then patterned and etched in any useful manner to define the upper pole piece having pole-tip and yoke regions (FIG. 1). In step 64, the two pole pieces are annealed for two-hours at 245 degrees Celsius in an external magnetic field of about 64 kA/m (800 Oe) aligned with the easy axis of the electroplated layers. Finally, in step 66, the remaining fabrication steps are performed to complete the closing and packaging of the finished head.

Magnetic write head 20 (FIG. 1) of this invention is suitable for use in a read/write head assembly such as may be employed in a data storage drive, which may be embodied as a disk drive or as a tape drive, for example.

Figure 3:
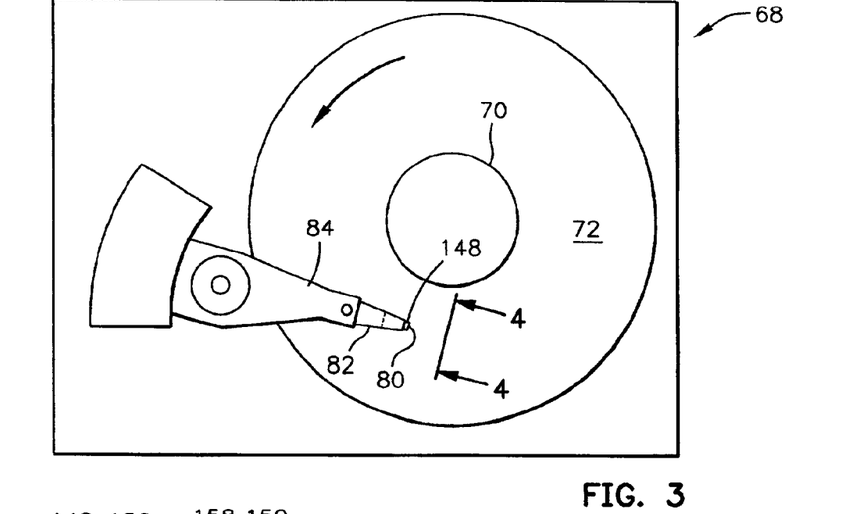
FIG. 3 is a plan view of an exemplary magnetic disk drive suitable for use with the magnetic head of this invention.
Figure 4:
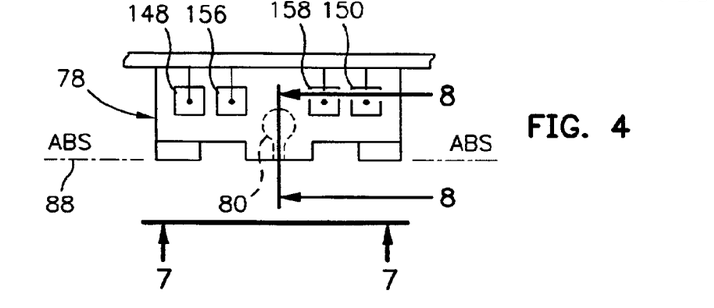
FIG. 4 is an end view of a slider with an exemplary magnetic head of this invention in the disk drive as seen in plane 4—4 of FIG. 3.
Figure 5:
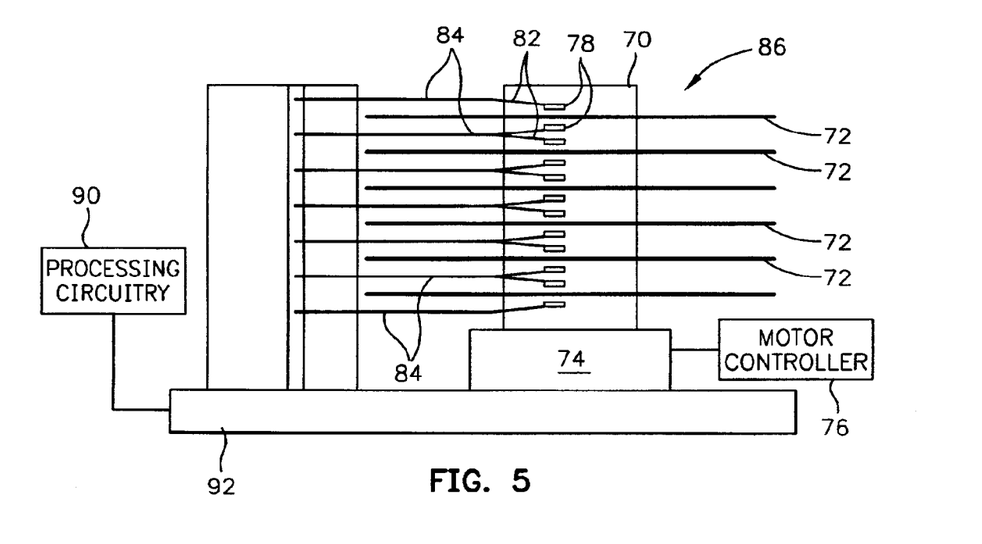
FIG. 5 is a schematic elevation view of the magnetic disk drive of FIG. 3 wherein multiple disks and magnetic heads are employed.

FIGS. 3–5 illustrate a magnetic disk drive 68. Magnetic disk drive 68 includes a spindle 70 that supports and rotates a magnetic disk 72. Spindle 70 is rotated by a motor 74 that is controlled by a motor controller 76. A slider 78 with a combined read and write magnetic head 80 is supported by a suspension 82 and an actuator arm 84. A plurality of disks, sliders and suspensions may be employed in a large-capacity direct access storage device (DASD) 86 as shown in FIG. 5. Suspension 82 and actuator arm 84 position slider 78 so that magnetic head 80 is in a transducing relationship with a surface of magnetic disk 72. When disk 72 is rotated by motor 74, slider 78 is supported on a thin (typically, 50 nm) cushion of air (air bearing) between the surface of disk 72 and the air bearing surface (ABS) 88. Magnetic head 80 may then be employed for writing information to multiple circular tracks on the surface of disk 72, as well as for reading information therefrom. The processing circuitry 90 exchanges signals, representing such information, with the head 80, provides motor drive signals for rotating the magnetic disk 72, and provides control signals for moving slider 78 to various tracks.

Figure 6:
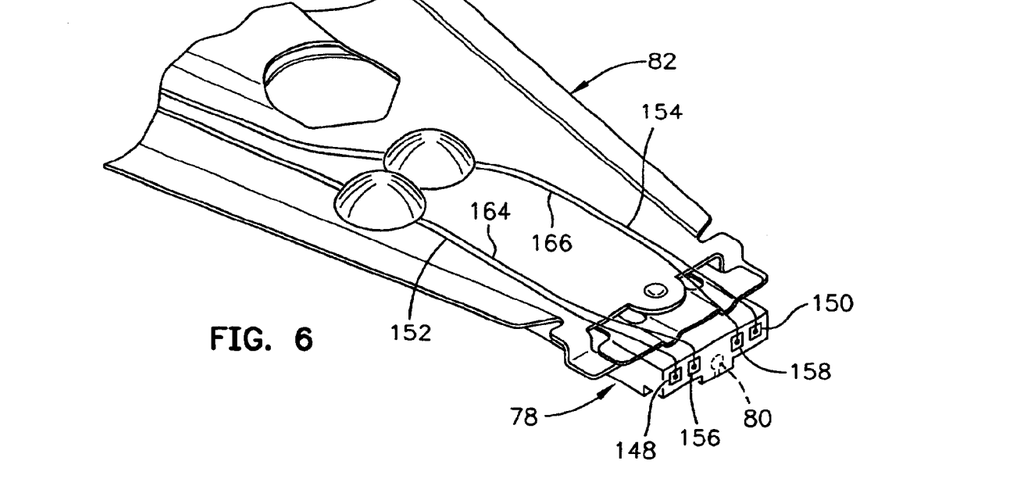
FIG. 6 is an isometric illustration of an exemplary suspension system for supporting the slider and magnetic head.
Figure 7:
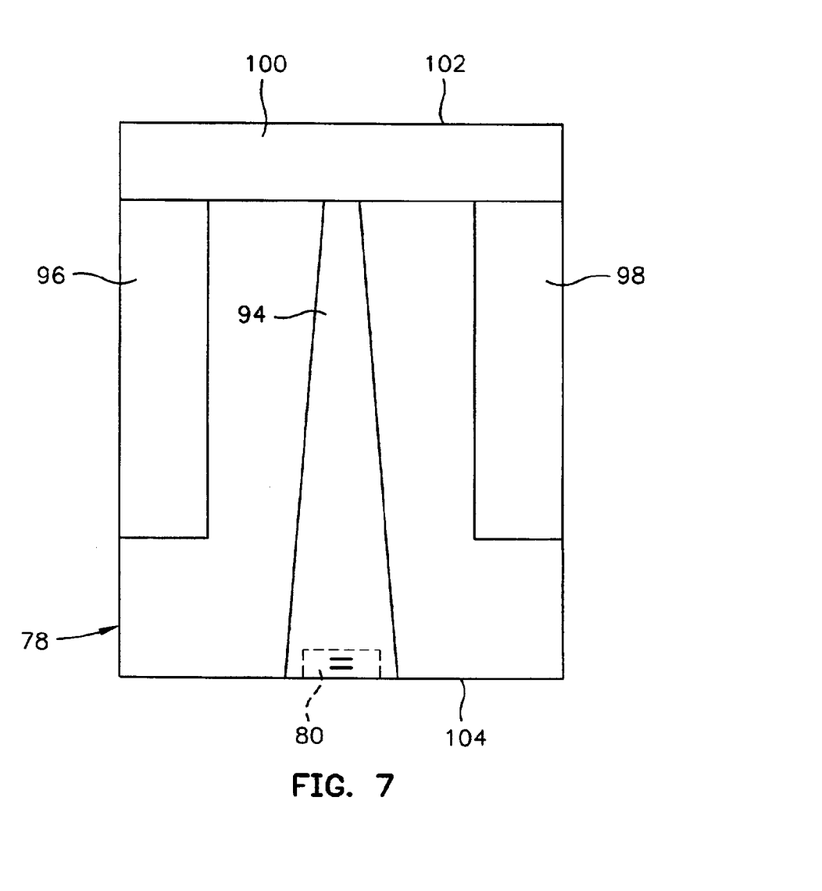
FIG. 7 is an ABS view of the exemplary magnetic head of this invention taken along plane 7—7 of FIG. 4.

In FIG. 6, slider 78 is shown mounted to suspension 82. The components described hereinabove may be mounted on a frame 92 of a housing, as shown in FIG. 5. FIG. 7 is an ABS view of slider 78 and magnetic head 80. Slider 78 has a center rail 94 that supports the magnetic head 80, and side rails 96 and 98. Rails 94, 96 and 98 extend from a cross rail 100. With respect to rotation of magnetic disk 72, cross rail 100 is at a leading edge 102 of slider 78 and magnetic head 80 is at a trailing edge 104 of slider 78.

Figure 8:
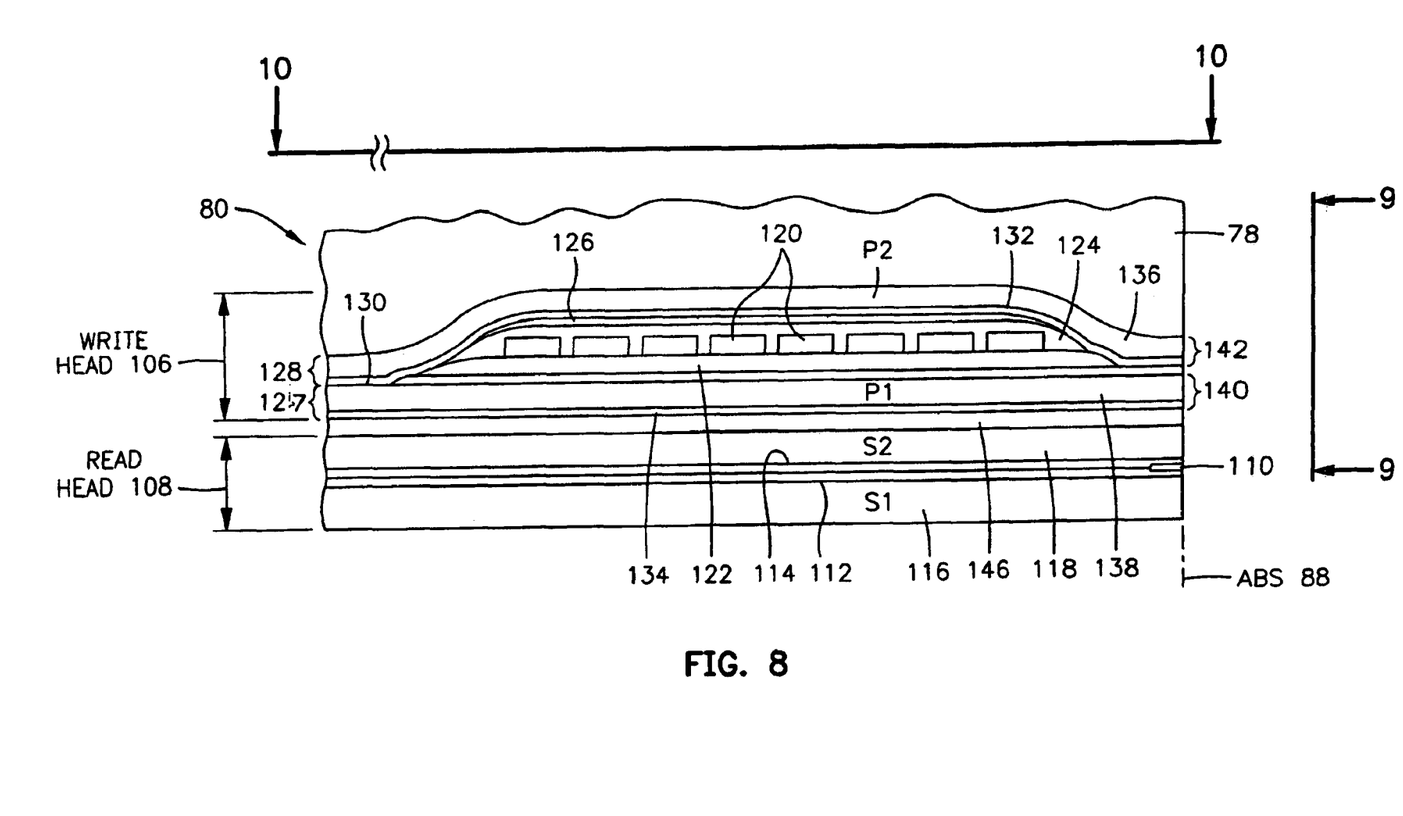
FIG. 8 is a partial view of the slider and exemplary magnetic head of this invention as seen in plane 8—8 of FIG. 4.
Figure 9:
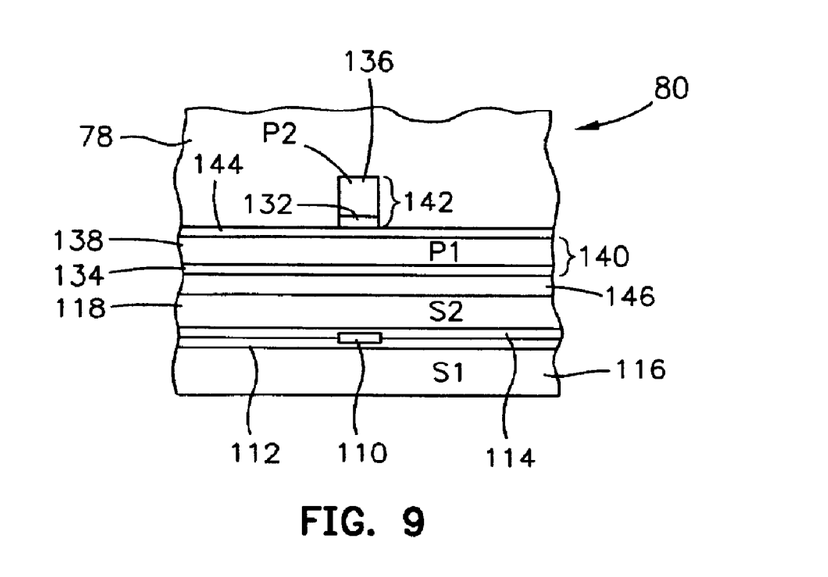
FIG. 9 is a partial ABS view of the slider taken along plane 9—9 of FIG. 8 to show the read and write elements of the magnetic head.

FIG. 8 is a side cross-sectional elevation view of an exemplary piggyback embodiment of read/write head 80, which includes a write head portion 106 employing the pole pieces of this invention (FIG. 1) and a read head portion 108. FIG. 9 is an ABS view of FIG. 8. A magnetic sensor 110 is sandwiched between the nonmagnetic electrically-nonconductive first and second read gap layers 112 and 114, which are in turn sandwiched between the first (S1) and second (S2) shield layers 116 and 118 made of relatively soft ferromagnetic material. In response to external magnetic fields, a sense current (not shown) conducted through sensor 110 manifests the external field changes as potential changes. These potential changes are then processed as readback signals by processing circuitry 90 (FIG. 5).

Figure 10:
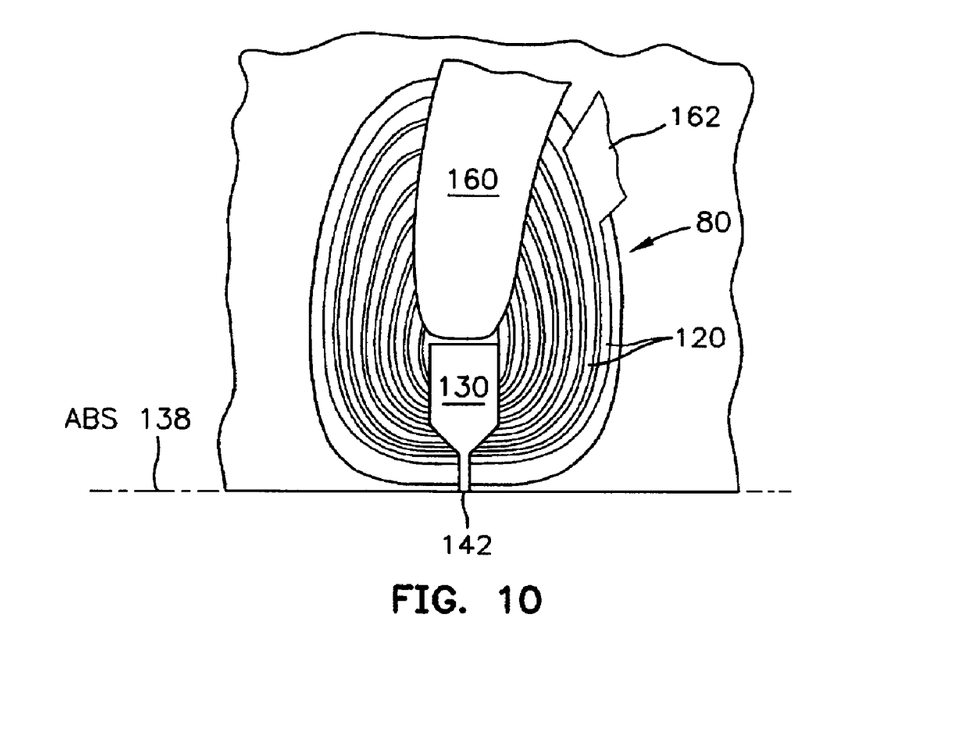
FIG. 10 is a view taken along plane 10—10 of FIG. 8 with all material above the second pole piece removed.

Write head portion 106 of magnetic head 80 includes a coil layer 120 sandwiched between first and second insulation layers 122 and 124. A third insulation layer 126 may be employed for planarizing the head to eliminate ripples in second insulation layer 124 caused by coil layer 120. First, second and third insulation layers 122–126 are referred to in the art as an "insulation stack." Coil layer 120 and first, second and third insulation layers 122, 124 and 126 are sandwiched between the first (P1) and second (P2) pole piece layers 127 and 128, which are magnetically coupled at a back gap (yoke) 130. First (P1) and second (P2) pole piece layers 127 and 128 each include respective seed layers 132 and 134 and electroplated layers 136 and 138 and have first and second pole tips 140 and 142, which are separated by a write gap layer 144 at the ABS 88. If desired, an insulation layer 146 may be located between second shield (S2) layer 118 and the first pole piece seed layer 134, but it is not necessary for proper operation of this invention. Because the second shield layer 118 and the first pole piece layer 127 are separate layers, this head geometry is commonly denominated a "piggyback" read/write head. As shown in FIGS. 4, 6 and 10, the first and second solder connections 148 and 150 connect leads from magnetic sensor 110 to the leads 152 and 154 on suspension 82, and the third and fourth solder connections 156 and 158 connect the leads 160 and 162 from coil 120 (see FIG. 10) to the leads 164 and 166 on suspension 82.

Figure 11:
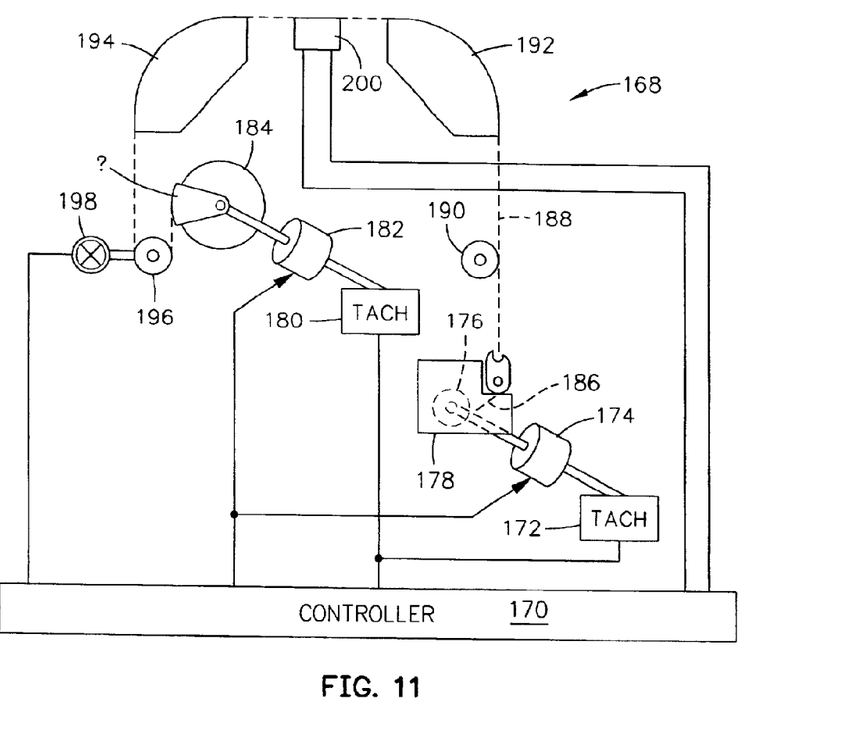
FIG. 11 is a schematic diagram illustrating a magnetic tape drive useful with the write head of this invention.

FIG. 11 shows a schematic diagram of a magnetic tape drive 168 useful with a read/write head assembly using magnetic write head 20 of this invention discussed above in connection with FIG. 1. The controller 170 accepts information from a supply reel tachometer 172, which is coupled to a supply reel motor 174, which is controlled by controller 170 to reversibly rotate a supply reel 176 shown within a single supply reel cartridge 178. A take-up reel tachometer 180 is connected to a take-up reel motor 182 that is reversibly driven by controller 170. Take-up reel motor 182 drives a take-up reel 184. The magnetic tape 186 and its leader block moves along a path shown by the dotted line 188, from supply reel 176 past an idler bearing 190, the air bearing tape guides 192 and 194, continuing around a roller 196 coupled to a tension arm transducer 198 under the control of controller 170, and therefrom to take-up reel 184, substantially as shown. The resulting output from the read elements in the read/write head assembly 200 is transmitted to controller 170, which also directs data from an external source to read/write head assembly 200 for transfer onto tape medium 186 through the plurality of write elements in read/write head assembly 200. Magnetic tape drive 168 may be generally of the one-half inch type having a single reel cartridge. As is well-known in the tape drive industry, other media formats are also available for example, quarter-inch cartridge (QIC), digital linear tape (DLT), digital analog tape (DAT), and the like.

Figure 12:
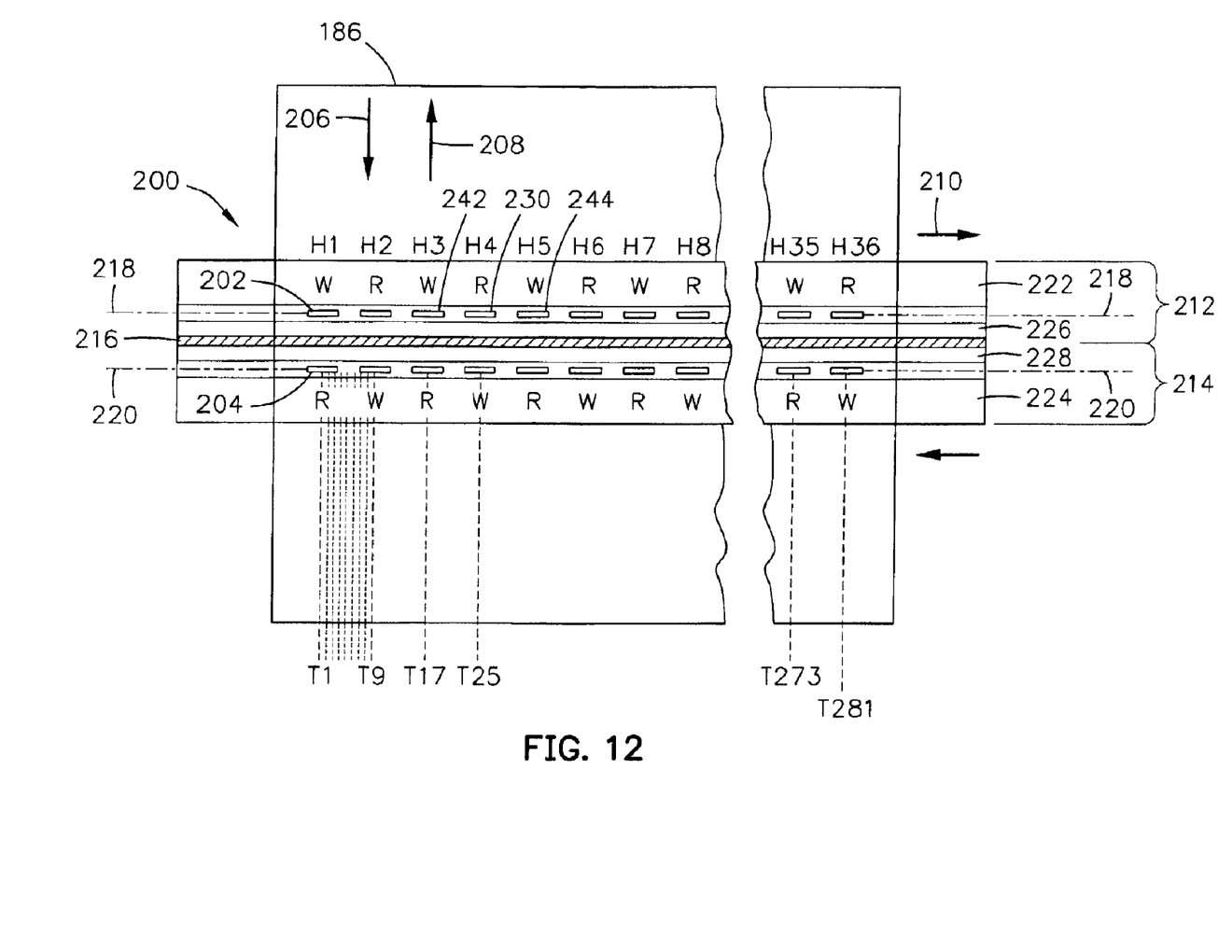
FIG. 12 illustrates a front view of the air bearing surface (ABS) of an interleaved head assembly from FIG. 11 in relation to a magnetic tape storage medium.

FIG. 12 shows a plan view of the air bearing surface (ABS) of an exemplary embodiment interleaved read/write head assembly 200 from FIG. 11, where the read elements are marked "R" and the write elements are marked "W." The write elements, exemplified by the write head 202 and the read elements, exemplified by the read head 204, are disposed in alternating fashion to form a single set of thirty-eight (for example) read/write track-pairs, exemplified by the R/W track-pair 202–204. As used herein, the term "alternating" is intended to include other formats. For example, one format provides that the odd-numbered heads H1, H3, H5 etc. are operative during forward tape movement, while the even-numbered heads H2, H4, H6 etc. are operative during the opposite direction of tape movement.

Generally, the length of magnetic tape medium 186 moves in either a forward or reverse direction as indicated by the arrows 206 and 208. Head assembly 200 is shown in FIG. 1 as if magnetic tape medium 186 were transparent, although such tape medium normally is not transparent. Arrow 206 designates a forward movement of tape medium 186 and arrow 208 designates a reverse direction. Magnetic tape medium 186 and head assembly 200 operate in a transducing relationship in the manner well-known in the art. Other formats usable in the practice of this invention are considered to be within the teaching of this invention.

Each of the head elements in head assembly 200 is intended to operate over a plurality of data tracks in magnetic tape medium 186, as may be appreciated with reference to the data tracks T1, T9, T17, etc. in FIG. 1, which shows an exemplary 288-track scheme having a data track density on magnetic tape medium 186 of eight times the recording element density of R/W track-pairs H1, H2, . . . H36 in MR head assembly 200. Tracks T9, T25, . . . T281 may be written with one pass of magnetic tape medium 186 in direction 206 over even-numbered R/W track-pairs H2, H4, . . . H36 and then tracks T1, T17, . . . T273 written on a return pass of magnetic tape medium 186 over the odd-numbered R/W track-pairs H1, H3, . . . H35 by moving the lateral position of MR head assembly 200 in the direction of the arrow 210 by a distance equivalent to one track pitch (T1–T2), which is about 12% of the R/W track-pair spacing (H1–H2).

Read/write head assembly 200 includes the thin-film modules 212 and 214 of generally identical construction. Modules 212 and 214 are joined together with an adhesive layer 216 to form a single physical unit, wherein the R/W track-pairs H1, H2, . . . H36 are aligned as precisely as possible in the direction of tape medium movement. Each module 212, 214 includes a head-gap line 218, 220, respectively, where the individual R/W gaps, exemplified by write head 202 and read head 204, in each module are precisely located. Each thin-film module 212, 214 includes a separate substrate 222, 224 and a separate closure piece 226, 228, respectively. Substrate 222 is bonded near head-gap line 218 by adhesive to closure piece 226 to form thin-film module 212 and substrate 224 is bonded near head-gap line 220 by adhesive to closure piece 228 to form thin-film module 214. As precisely as possible, head-gap lines 218, 220 are disposed perpendicular to the directions of tape medium movement as represented by arrows 206, 208. The R/W head-gaps at H1–H36 in thin-film module 212 cooperate with the corresponding R/W head-gaps in thin-film module 214 to provide read-after-write functionality during movement of magnetic tape medium 186. The read head gaps of one thin-film module are precisely aligned with the write head gaps of the other module along the direction of movement of tape medium 186. Thus, for example, write head 202 is aligned with read head 204 to form a single R/W track-pair H1 for read-after-write during magnetic tape movement in the direction indicated by arrow 206.

Figure 13:
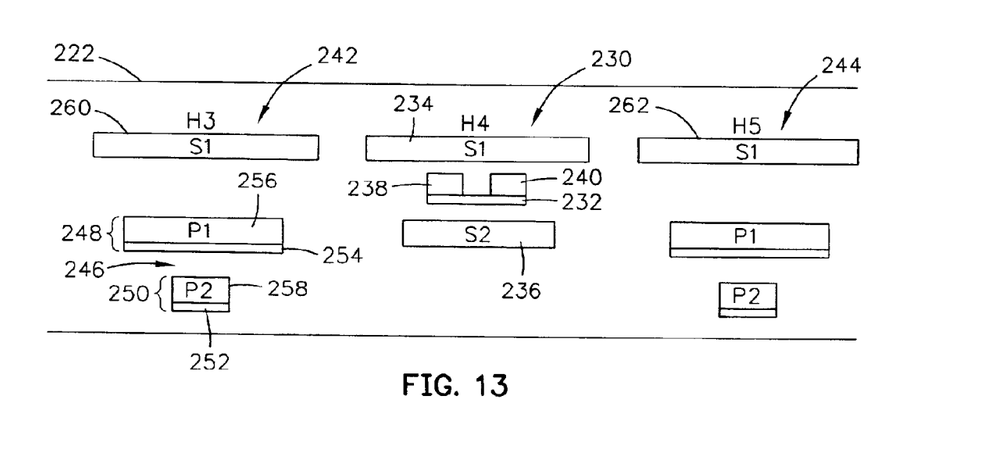
FIG. 13 illustrates a cutaway portion of the head assembly from FIG. 12 expanded to illustrate the features of the interleaved thin-film read and write heads, including an exemplary write head of this invention.

FIG. 13 shows in detail (not to scale) a portion of substrate 222 from FIG. 12, including portions of three exemplary R/W head gaps on head-gap line 218, which are aligned with track-pairs H3–H5 substantially as shown. The thin-film elements shown in FIG. 13 are illustrated showing submicron detail in the usual manner and are not to scale. Considering first the read-head 230 at track-pair H4, a magnetic sensor element 232 is disposed between the two element (S2 & S1) shields 234 and 236, with each sensor end coupled to an electrical lead conductor 238 and 240. As in FIG. 12, read head 230 is seen to be disposed between the two write heads 242 and 244 positioned for writing data on track-pairs H3, H5, each adjacent to track-pair H4, substantially as shown. Write head 244 is substantially identical to write head 240, which includes a write-gap 246 defined by two spaced magnetic pole (P1 & P2) tips 248 and 250, each including a lower seed layer 252, 254 underlying an electroplated layer 256, 258. Write head 242 may also include a write-gap S1 shield 260 (substantially identical to the write-gap S1 shield 262 in write head 244) substantially in line with MR element S1 shield 234. Write-gap S1 shield 260 may be electrically isolated from magnetic pole P1 tip 56 by means of an intermediate insulating layer as shown or may be in contact therewith and may be deposited using the same material and deposition cycle as element S1 shield 234 to improve manufacturability.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A magnetic head comprising:
   first and second pole pieces including first and second pole tips separated by a gap layer; and
   the first and second pole pieces each including a body-centered cubic (BCC) nickel-iron alloy layer containing from 64% to 81% iron by weight.

2. The magnetic head of claim 1 wherein at least one of the first and second pole pieces comprises:
   a seed layer having a first saturation flux density underlying an electroplated BCC nickel-iron alloy layer having a second saturation flux density no greater than the first saturation flux density.

3. A magnetic head comprising:
   first and second pole pieces including first and second pole tips separated by a gap layer;
   the first and second pole pieces each including a body-centered cubic (BCC) nickel-iron alloy layer containing from 64% to 81% iron by weight;
   at least one of the first and second pole pieces comprising:
      a seed layer having a first saturation flux density underlying an electroplated BCC nickel-iron alloy layer having a second saturation flux density no greater than the first saturation flux density; and
      the second saturation flux density being in the range from about 1.9 teslas to about 2.3 teslas.

4. The magnetic head of claim 2 wherein the underlying seed layer comprises a material selected from a group consisting essentially of:
   a nickel-iron alloy (NiFe), an iron-nitride-X alloy (FeNX) and a cobalt-iron-X (CoFeX) alloy wherein X comprises a material selected from a group comprising nickel, nitrogen, rhodium, aluminum and tantalum.

5. A magnetic head comprising:
   first and second pole pieces including first and second pole ups separated by a gap layer;
   the first and second pole pieces each including a body-centered cubic (BCC) nickel-iron alloy layer containing from 64% to 81% iron by weight; and
   the coercivity of the first and second pole pieces being less than about 160 amps/meter.

6. A magnetic read/write head comprising:
   first and second pole pieces including first and second pole tips separated by a first gap layer;
   a magnetic sensor sandwiched between second and third gap layers, the second and third gap layers being sandwiched between first and second shield layers, the second shield layer being generally adjacent to the first pole piece; and
   the first and second pole pieces each including a body-centered cubic (BCC) nickel-iron alloy layer containing from 64% to 81% iron by weight.

7. The magnetic read/write head of claim 6 wherein at least one of the first and second pole pieces comprises:
   a seed layer having a first saturation flux density underlying an electroplated BCC nickel-iron alloy layer having a second saturation flux density no greater than the first saturation flux density.

8. A magnetic read/write head comprising:
first and second pole pieces including first and second pole tips separated by a first gap layer;
a magnetic sensor sandwiched between second and third gap layers, the second and third gap layers being sandwiched between first and second shield layers, the second shield layer being generally adjacent to the first pole piece;
the first and second pole pieces each including a body-centered cubic (BCC) nickel-iron alloy layer containing from 64% to 81% iron by weight;
at least one of the first and second pole pieces comprising:
a seed layer having a first saturation flux density underlying an electroplated BCC nickel-iron alloy layer having a second saturation flux density no greater than the first saturation flux density; and
the second saturation flux density being in the range from about 1.9 teslas to about 2.3 teslas.

9. The magnetic read/write head of claim 7 wherein the underlying seed layer comprises a material selected from a group consisting essentially of:
a nickel-iron alloy (NiFe), an iron-nitride-X alloy (FeNX) and a cobalt-iron-X (CoFeX) alloy wherein X comprises a material selected from a group comprising nickel, nitrogen, rhodium, aluminum and tantalum.

10. A magnetic read/write head comprising:
first and second pole pieces including first and second pole tips separated by a first gap layer;
a magnetic sensor sandwiched between second and third gap layers, the second and third gap layers being sandwiched between first and second shield layers, the second shield layer being generally adjacent to the first pole piece;
the first and second pole pieces each including a body-centered cubic (BCC) nickel-iron alloy layer containing from 64% to 81% iron by weight;
a first insulation layer disposed over the first pole piece;
at least one coil layer disposed over the first insulation layer; and
a second insulation layer disposed over the coil layer; and
the second pole piece being disposed over the second insulation layer.

11. A magnetic read/write head comprising:
first and second pole pieces including first and second pole tips separated by a first gap layer;
a magnetic sensor sandwiched between second and third gap layers, the second and third gap layers being sandwiched between first and second shield layers, the second shield layer being generally adjacent to the first pole piece;
the first and second pole pieces each including a body-centered cubic (BCC) nickel-iron alloy layer containing from 64% to 81% iron by weight; and the coercivity of the first and second pole pieces being less than about 160 amps/meter.

12. A magnetic data storage drive for storing data on a magnetic medium, the drive comprising:
a magnetic head including
first and second pole pieces including first and second pole tips separated by a gap layer, the first and second pole pieces each including a body-centered cubic (BCC) nickel-iron alloy layer containing from 64% to 81% iron by weight;

a housing;
a support mounted in the housing for supporting the magnetic head;
medium moving means mounted in the housing for moving the magnetic medium past the magnetic head in a transducing relationship therewith;
positioning means connected to the support for moving the magnetic head to a plurality of positions with respect to the moving magnetic medium so as to process signals with respect to a plurality of data storage tracks on the magnetic medium; and
control means connected to the magnetic head, the medium moving means and the positioning means for controlling and processing signals with respect to the magnetic head, controlling movement of the magnetic medium and controlling the position of the magnetic head.

13. The magnetic data storage drive of claim 12 wherein at least one of the first and second pole pieces comprises:
a seed layer having a first saturation flux density underlying an electroplated BCC nickel-iron alloy layer having a second saturation flux density no greater than the first saturation flux density.

14. The magnetic data storage drive of claim 13 wherein the second saturation flux density is in the range from about 1.9 teslas to about 2.3 teslas.

15. The magnetic data storage drive of claim 13 wherein the underlying seed layer comprises a material selected from a group consisting essentially of:
a nickel-iron alloy (NiFe), an iron-nitride-X alloy (FeNX) and a cobalt-iron-X (CoFeX) alloy wherein X comprises a material selected from a group comprising nickel, nitrogen, rhodium, aluminum and tantalum.

16. The magnetic data storage drive of claim 13 further comprising:
a first insulation layer disposed over the first pole piece;
at least one coil layer disposed over the first insulation layer; and
a second insulation layer disposed over the coil layer; wherein
the second pole piece is disposed over the second insulation layer.

17. The magnetic data storage drive of claim 12 wherein the magnetic head comprises:
first and second pole pieces including first and second pole tips separated by a first gap layer; and
a magnetic sensor sandwiched between second and third gap layers, the second and third gap layers being sandwiched between first and second shield layers, the second shield layer being generally adjacent to the first pole piece; and
the first and second pole pieces each including a BCC nickel-iron alloy layer containing from 64% to 81% iron by weight.

18. The magnetic data storage drive of claim 12 wherein the nickel-iron alloy in first and second pole pieces has a coercivity of less than about 160 amps/meter.

19. The magnetic data storage drive of claim 12 wherein:
the moving magnetic medium includes a rotating magnetic disk.

20. The magnetic data storage drive of claim 12 wherein:
the moving magnetic medium includes a streaming magnetic tape.

21. A method of fabricating a magnetic write head comprising the steps of:

providing a substrate;

forming a first magnetic pole layer over the substrate by performing the steps of:
- forming a first underlying seed layer of a first ferromagnetic (FM) material having a first saturation flux density, and
- electroplating the first underlying seed layer with a second FM material having a second saturation flux density no greater than the first saturation flux density;

forming a gap filling layer over the first magnetic pole layer; and forming a second magnetic pole layer over the gap filling layer by performing the steps of:
- forming a second underlying seed layer of a third FM material having a third saturation flux density;
- electroplating the second underlying seed layer with a fourth FM material having a fourth saturation flux density no greater than the third saturation flux density; and annealing the FM materials in the first and second magnetic pole layers to reduce the coercivity thereof to less than about 160 amps/meter.

* * * * *